(12) United States Patent
Katakami et al.

(10) Patent No.: US 6,552,281 B2
(45) Date of Patent: Apr. 22, 2003

(54) FOLDING KEYBOARD

(75) Inventors: Seiki Katakami, Gunma (JP); Takashi Niiyama, Gunma (JP)

(73) Assignee: Hosiden Corporation, Osaka (JP)

( * ) Notice: Subject to any disclaimer, the term of this patent is extended or adjusted under 35 U.S.C. 154(b) by 0 days.

(21) Appl. No.: 09/952,775

(22) Filed: Sep. 13, 2001

(65) Prior Publication Data
US 2002/0033761 A1 Mar. 21, 2002

(30) Foreign Application Priority Data
Sep. 21, 2000 (JP) ....................... 2000-286584

(51) Int. Cl.[7] ............................................. H01H 13/70
(52) U.S. Cl. ...................... 200/5 A; 361/680; 341/22; 400/489
(58) Field of Search ........................ 200/5 A; 341/20, 341/22; 345/168, 173; 361/680, 681; 400/472–474, 489

(56) References Cited
U.S. PATENT DOCUMENTS 5,457,453 A * 10/1995 Chiu et al. .................... 341/22
5,653,543 A * 8/1997 Abe ............................ 361/680
5,995,025 A * 11/1999 Sternglass et al. ............. 341/22
6,081,207 A * 6/2000 Batio .......................... 341/20
2002/0066651 A1 * 6/2002 Furuki et al. ............... 200/5 A

* cited by examiner

Primary Examiner—Michael Friedhofer
(74) Attorney, Agent, or Firm—David N. Lathrop, Esq.; Gallagher & Lathrop

(57) ABSTRACT

A keyboard is severed along a boundary line between adjacent keytops located generally in the center of the length into keyboard parts (2, 3). An elongated cover plate (11) is pivotally attached on one side edge thereof to the lower portion of the severed face of one (2) of the divided keyboard parts, the cover plate (11) having opposed brackets (12) bent and extending in the same direction from the opposite ends thereof and opposed slide pins (19) provided one on each of the brackets toward the other side edge of the cover plate opposite from the severed face, the slide pins (19) being slidably received in corresponding elongated grooves (16) formed in the front and rear outside surfaces of the other divided keyboard part (3), and pins (17, 18) provided on the front and rear side panels of each of the divided keyboard parts being slidably and loosely fitted in elongated slots in moving links (13).

11 Claims, 11 Drawing Sheets

FOLDING KEYBOARD

BACKGROUND OF THE INVENTION

This invention relates to a folding or collapsible keyboard which comprises foldable divided keyboard parts with a cover plate covering the severed or parted surfaces of the keyboard which are exposed when folded.

Folding keyboards have been proposed which comprises keyboard parts divided along a boundary line between the adjacent keytops located generally in the center of the keyboard so as to be foldable into a compact size when carried. The Japanese Patent Kokai Publication No. 2000-56904 discloses an example of the folding keyboard of such type in which the severed surfaces of the keyboard exposed when folded are adapted to be covered by a cover plate.

The folding keyboard as disclosed in this Patent Publication will now be briefly described with reference to FIGS. 1–3. FIG. 1(a) illustrates the keyboard 1 comprising divided keyboard parts 2 and 3 separated along a longitudinal central line thereof and the divided keyboard parts 2 and 3 as being folded with the keytop sides facing inwardly toward each other. The divided keyboard parts 2 and 3 are connected together by a cover plate 71 and hinges 72, 73 and is adapted to be brought into the usable state by opening them on the opposite side from the cover plate 71 from the folded position shown in FIG. 1(a), as sequentially shown in FIGS. 1(b), (c) and (d).

Specifically, in this prior art folding keyboard it is to be noted as shown in FIG. 2 that one 3 of the divided keyboard parts 2 and 3 divided along a boundary line between the adjacent keytops located generally in the center of the keyboard 1 is pivotally connected at its cut edge to one of the opposite side edges of the cover plate 71 by the hinges 73 while a rectangular support plate 81 for the keyboard part 3 is pivotally connected on its one side to the other side edge of the cover plate 71 by the hinges 72. The support plate 81 is formed along its opposite side edges with a pair of ribs 82 extending parallel to the length of the keyboard 1 while the other divided keyboard part 2 is provided with guide grooves 83 (see FIG. 3) in its bottom surface adjacent its front and rear side edges such that the guide grooves 83 are slidably loosely fitted over the outside edges of the support plate 81 and the ribs 82. With this construction, the keyboard part 2 is supported retractably for movement into abutment with the opposing keyboard part 3 at the parted position along the ribs 82 of the support plate 81 longitudinally of the keyboard 1.

Lock levers 86 are pivotally supported by pins 87 on the divided keyboard part 3 on its outer surfaces adjacent the mating face for abutment with the divided keyboard part 2 and are biased by springs 88 such that the forward ends 89 thereof toward the divided keyboard part 2 are inwardly urged. The forward ends 89 of the lock levers 86 are provided with inwardly angled pawls 89a. The divided keyboard part 3 is formed with guide ribs 85 which extend in opposition to and co-extensively with the respective guide ribs 82 in the open position of the divided keyboard parts 2 and 3 as shown in FIGS. 2 and 3 such that as the divided keyboard part 2 is moved toward the divided keyboard part 3 in the direction shown by the arrow, the divided keyboard part 2 is brought into abutment with the severed face of the divided keyboard part 3 while the guide grooves 83 are fitted over the guide ribs 85 and the pawls 89a at the forward ends 89 of the lock levers 86 come into engagement within the corresponding catch recesses 84 formed in the side surfaces of the divided keyboard part 2 whereby the divided keyboard parts 2 and 3 are integrated together.

From the folded state of the divided keyboard parts 2 and 3 as shown in FIG. 1(a), they are rotated into the horizontal position as shown in FIG. 1(c) via the position shown in FIG. 1(b) by opening their ends opposite from the coupled ends in the direction shown by the arrows. In that horizontal position, the divided keyboard parts 2 and 3 are moved toward each other in the direction shown by the arrows until the severed faces of the divided keyboard parts 2 and 3 come into abutment whereupon the divided keyboard parts 2 and 3 are secured together in the same plane by the latch mechanism 75 comprising the lock levers 86 and the catch recesses 84 to assume the usable position as shown in FIG. 1(d).

The prior art folding keyboard illustrated requires not only the hinges 72 for pivotally connecting the support plate 81 and the cover plate 71 but also the mechanism for allowing the divided keyboard part 2 to slide along the guide ribs 82 in order that the cover plate 71 for covering the severed surfaces of the divided keyboard parts 2 and 3 which are exposed in the folded position as shown in FIG. 1(a) may be flexible with respect to the divided keyboard parts 2 and 3. Consequently, the prior art folding keyboard was awkward in the opening and closing operations for changing the state between the folded position and the usable position which required two operations, the rotating operation and the sliding operation. In addition, the construction requiring such two operations has the drawback that it is mechanically susceptible to failure.

Accordingly, an object of this invention is to provide a folding keyboard which provides for effecting the opening and closing operation in one operation and hence which is mechanically sturdy.

SUMMARY OF THE INVENTION

According to this invention, the keyboard comprises two keyboard parts divided along a boundary line between the adjacent keytops located generally in the center of the keyboard, an elongated cover plate pivotally attached on one side edge thereof to the lower portion of the severed surface of one of the two divided keyboard parts, opposed brackets bent and extending in the same direction from the opposite end edges of the cover plate, opposed slide pins planted in the brackets toward the other side edge of the cover plate, and elongated grooves formed in the outside surfaces of the opposite side panels of the other divided keyboard part for slidably receiving the corresponding slide pins. The folding keyboard further includes moving links having elongated slots in which pins provided on the opposite side panels of each of the divided keyboard parts are slidably and loosely fitted.

DETAILED DESCRIPTION OF THE INVENTION

One embodiment of this invention will now be described.

Figure 4A:
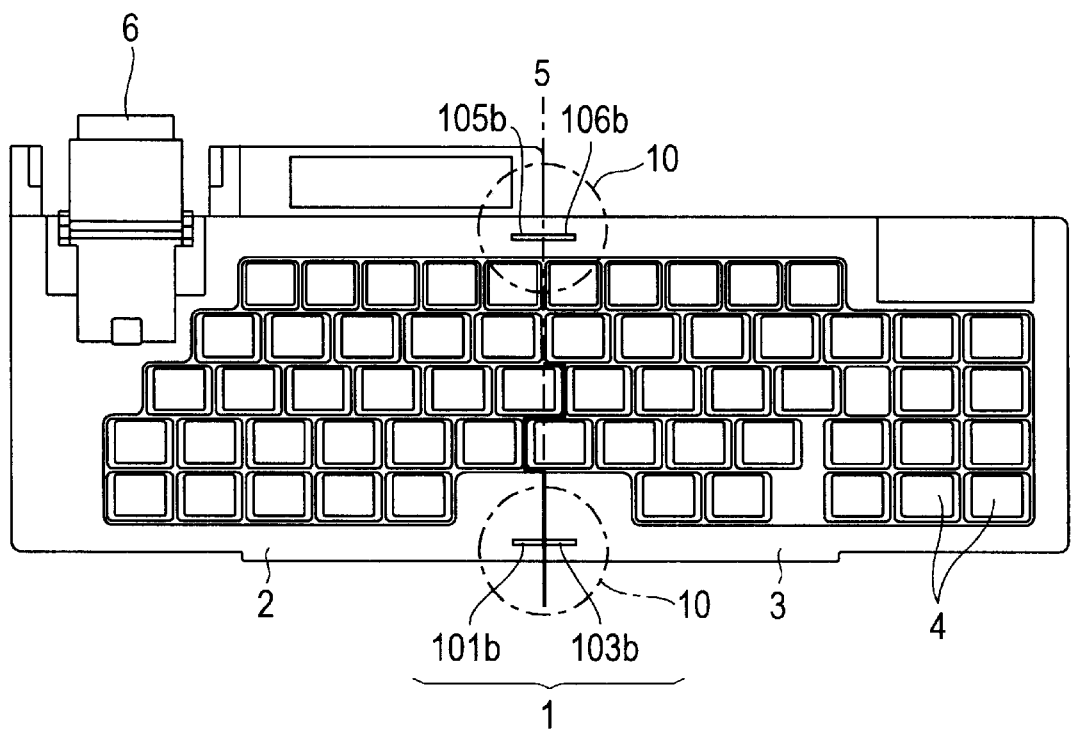
FIG. 4(a) is a front view illustrating the folding keyboard according to an embodiment of this invention being in its usable state.
Figure 4B:
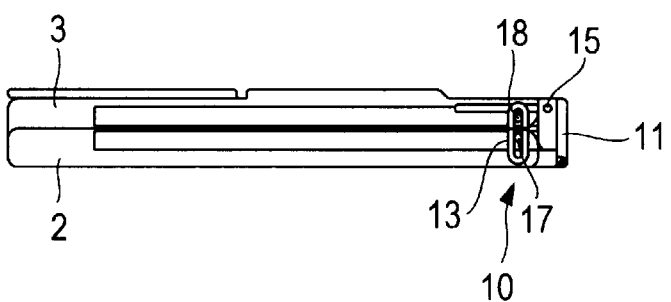
FIG. 4(b) is a side view focused on the hinge mechanism of the keyboard in its folded state.

FIG. 4(a) is a plan view illustrating the folding keyboard in its usable state. The keyboard 1 comprises the divided keyboard parts 2 and 3 severed along a parting line at a boundary located generally in the center in the direction of the length (left to right) of the keyboard, the divided keyboard parts 2 and 3 being foldably connected together by means of hinge mechanisms 10 provided at the parted portion of the keyboard. FIG. 4(b) is a front view showing the divided keyboard parts 2 and 3 folded against each other with their keytop sides facing inwardly. It should be understood that FIG. 4(b) is an illustration drawn for the benefit of understanding of the hinge mechanism in which it is depicted an outline different than the actual one. A connector 6 for connection with external equipment is attached to the rear face of the keyboard adjacent one end thereof.

FIG. 5 illustrates a fraction of the folding keyboard of the present invention and the arrangement of the hinge mechanism 10 in the various positions from the folded (stowed) state to the usable (open) state.

The hinge mechanism 10 comprises a coupling pin 17 provided on the side panel of one divided keyboard part 2 toward its severed face, a coupling pin 18 and an elongated groove 16, a cover plate 11, a bracket 12 affixed to the cover plate 11, a slide pin 19 planted in the bracket 12, a moving link 13, a pivot pin 15, etc.

Figure 5A:
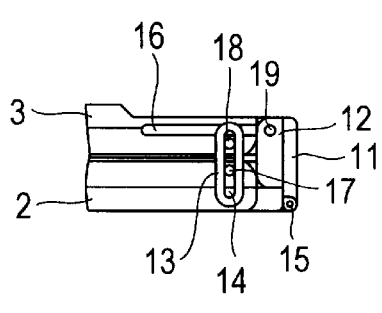
FIG. 5(a) is a side view illustrating the folding keyboard according to the embodiment shown in FIG. 4(a) being in its folded state.
Figure 5B:
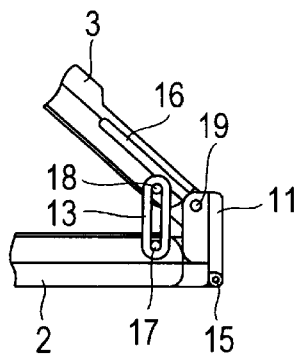
FIGS. 5(b), 5(c) and 5(d) are sequential side views illustrating the intermediate states of the keyboard of the embodiment shown in FIG. 4(a) from the folded state to the usable state.
Figure 5C:
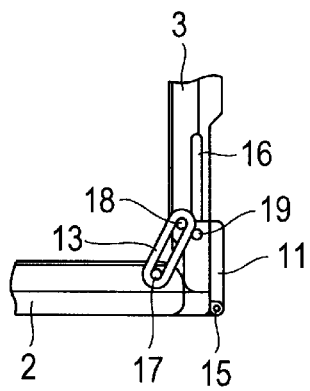
Figure 5D:
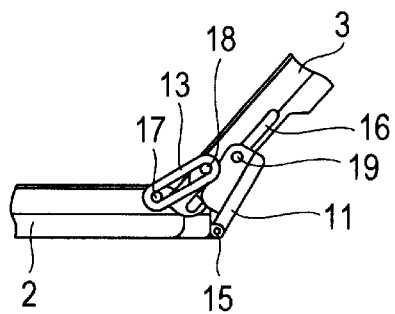
Figure 6A:
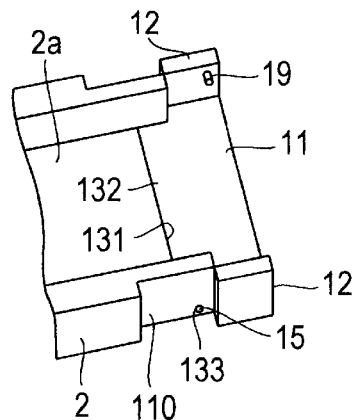
FIG. 6(a) is a perspective view illustrating the connection between the divided keyboard part 2 and the cover plate 11 in the embodiment shown in FIG. 4(a, )
Figure 6B:
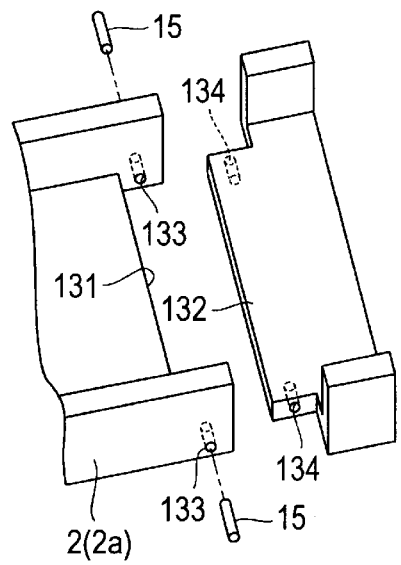
FIG. 6(b) is an exploded perspective view of FIG. 6(a)

FIG. 6(a) schematically illustrates in a perspective view how the cover plate 11 is connected to the one divided keyboard part 2. The cover plate 11 is in the form of an elongated plate and may be a molded part of ABS resin, for example. The cover plate 11 has a length approximately equal to the length of the severed surfaces of the divided keyboard parts 2 and 3 extending between the front side and the rear side of the folding keyboard 1 and a width approximately equal to the sum of the thicknesses of the severed surfaces of the divided keyboard parts 2 and 3. With the divided keyboard parts 2 and 3 in their folded state, the cover plate 11 is adapted, as shown in FIG. 5(a) and FIG. 6(b) to close the interior of the keyboard in opposing relation to the severed faces of both of the divided keyboard parts 2 and 3 with one (the lower side edge as viewed in FIG. 5(a) ) of the opposite side edges of the cover plate 11 pivotally connected to the severed face of the divided keyboard part 2 adjacent its lower portion. By way of example, as shown in FIG. 6(a) and FIG. 6(b) which is an exploded view of FIG. 6(a), the bottom panel 2a of the divided keyboard part 2 may be formed with a cutout 131 at the severed face such that the end portions of the opposite side panels of the keyboard part 2 protrude a short distance beyond the severed face while the cover plate 11 has an elongated joint flange 132 extending from the side edge thereof on the coupling side except for the opposite end portions thereof. The joint flange 132 is arranged to be generally fitted in the cutout 131. Those protruding end portions of the front and rear side panels of the keyboard part 2 defined by the cutout 131 have through-apertures 133 extending therethrough while the front and rear side surfaces of the joint flange 132 are formed with pin receiving holes 134 in alignment with the respective apertures 133. Pivot pins 15 are passed through and held in the through-apertures 133 and extend into the respective pin receiving holes 134 to pivotally support the cover plate 11 on the divided keyboard part 2.

The cover plate 11 has opposed integral brackets 12 upstanding in the same direction generally perpendicularly therefrom at the opposite longitudinal ends thereof. The brackets 12 have opposing slide pins 19 (only one of which is visible in FIG. 6(a)) extending from their inner surfaces toward the side edge thereof opposite from the joint flange 132.

The divided keyboard part 3 has grooves 16 elongated in the left-to-right direction (longitudinal of the keyboard 1) formed in the outside surfaces of the opposite side panels thereof toward the severed face, in which grooves 16 the corresponding slide pins 19 are slidably engaged. The coupling pins 17 and 18 planted in the opposite side panels of the divided keyboard parts 2 and 3 are inserted in the elongated slots (cutouts) 14 of the associated moving links 13 received in the side panels to allow for the sliding movement of the moving links.

Figure 7A:
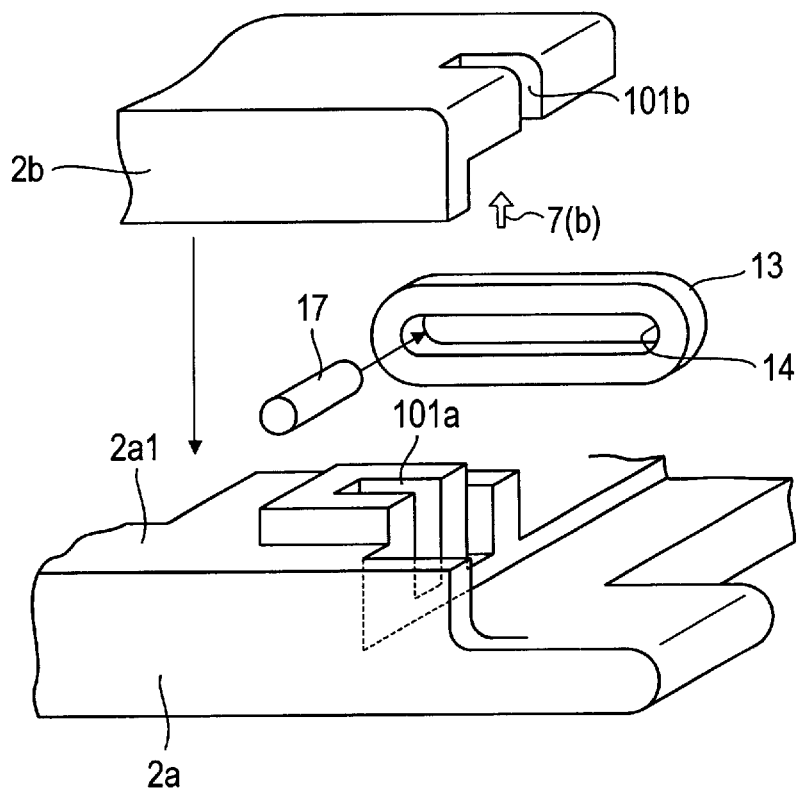
FIG. 7(a) is an exploded perspective view illustrating an embodiment in which the moving link 13 and the coupling pin 17 are provided on the side panel of the divided keyboard part 2.
Figure 7B:
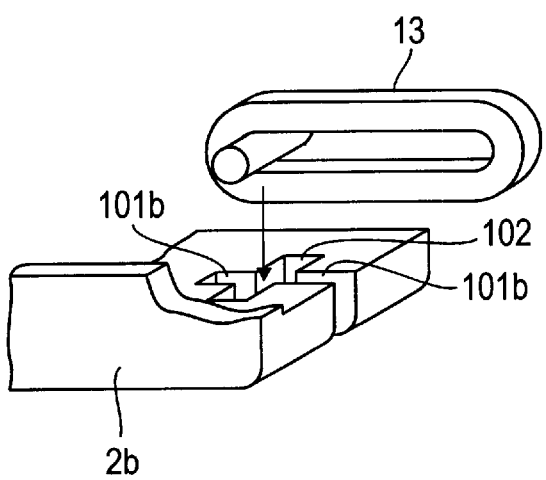
FIG. 7(b) is a partly cut away perspective view of the part looking in the direction indicated by the arrow 7(b) in FIG. 7(a)

As shown in a fractional exploded view in FIG. 7(a), for example, the case of the divided keyboard part 2 comprises a rectangular tray-like bottom section 2a and a U-shaped top section 2b placed on flange portions 2a1 formed around three sides of the rectangular tray-like bottom section 2a. The bottom section and the top section may be secured together as by screws. Shown in FIG. 7(a) is a portion of the divided keyboard part 2 toward the severed face in which the flange portion 2a1 has a vertically extending and upwardly and forwardly open link receiving groove 101a formed in its upper surface adjacent the severed face while the U-shaped top section 2b is formed with a link receiving groove 101b in communication with the link receiving groove 101a and extending through the upper surface of the top section. Further, as shown in FIG. 7(b) which is a perspective view of the part looking in the direction indicated by the arrow 7(b) in FIG. 7(a) and partly cut away to show the interior where the link receiving groove 101b is formed, the U-shaped top section 2b is formed with a short pin supporting groove 102 intersecting orthogonally with the link receiving groove 101b. With the coupling pin 17 inserted in the elongated slot 14 in the moving link 13, one half of the moving link 13 is disposed in the link receiving groove 101a and the coupling pin 17 is accommodated in the pin supporting groove 102. In this state, the bottom section and the top section are secured together. The opposite end portions of the pin supporting groove 102 are closed by the projecting surfaces of the inner face of the keyboard part 2 where the link receiving groove 101a is formed whereby the coupling pin 17 accommodated in the pin supporting groove 102 is held in the side panel of the divided keyboard part 2.

Although not shown, the other divided keyboard part 3 is likewise formed in the forward portion toward the severed face with link receiving grooves 103a and 103b (the link receiving groove 103a is not shown and only the link receiving groove 103b is shown) and a pin supporting groove 104 (not shown) similar to the link receiving groove 101a, the link receiving groove 101b and the pin supporting groove 102, respectively. The other half of the moving link 13 is disposed in the link receiving grooves 103a and 103b, and the coupling pin 18 is accommodated in the pin supporting groove 104 to be held in the side panel of the divided keyboard part 3.

The length of the moving link 13 is less than the sum of the thicknesses of the divided keyboard parts 2 and 3 and the width of the surface of the moving link 13 where the elongated slot 14 is formed is approximately equal to half the thickness of each of the divided keyboard parts 2 and 3. The length of the elongated slot 14 is slightly longer than the spacing between the coupling pins 17 and 18 in the usable state of the folding keyboard while the width of the elongated slot 14 is slightly larger than the outer diameter of the coupling pins 17 and 18.

Similar moving link 13 and coupling pins 17 and 18 are also provided in the rear portion of the divided keyboard parts 2 and 3 adjacent the severed faces. The corresponding link receiving grooves 105b and 106b are shown in FIG. 4(a).

Referring again to FIG. 5, the various states of the folding keyboard from the folded (stowed) state to the usable (open) state will be described in more details. In FIG. 5, the cover plate 11, moving link 13, pins 17, 18, 19 and elongated groove 16 shown in solid lines for the benefit of understanding the relationship therebetween.

Figure 6C:
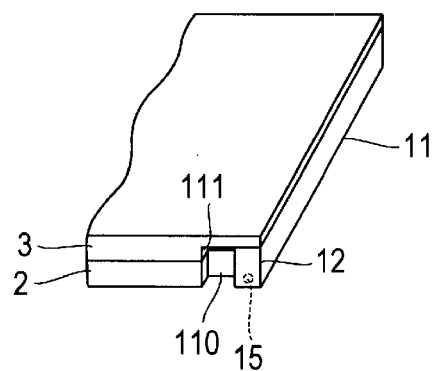
FIG. 6(c) is a perspective view illustrating how the severed faces of the folding keyboard of the embodiment shown in FIG. 4(a) in the folded state is covered with the cover plate 11.

(a) In the horizontally disposed folded state, the divided keyboard parts 2 and 3 are folded one on the other with the sides of their keytops 4 facing each other. The cover plate 11 covers the severed faces of the divided keyboard parts while it is oriented perpendicularly to the bottom plane of the divided keyboard part 2. The pin 19 planted in the bracket 12 is at a position closer to the severed faces of the keyboard in the elongated groove 16 of the divided keyboard part 3. The moving link 13 is oriented generally perpendicularly to the bottom plane of the divided keyboard part 2 as it is guided by the pins 17, 18. To be accurate, as shown in FIG. 6(c), the severed faces of the divided keyboard parts 2 and 3 and the joint portion therebetween are completely covered by the cover plate 11 and its brackets 12. Further, it should be noted that shallow recesses 110, 111 are formed in the outside surfaces of the opposite side panels of the divided keyboard parts 2 and 3 toward the severed faces so that the brackets 12 do not protrude beyond the sides of the folding keyboard and in order that the rotating of the brackets may not be interfered with.

(b) As the end portion of the divided keyboard part 3 opposite from the severed face is raised from the folded state (a), the divided keyboard part 3 is swung about the slide pins 19 and the coupling pins 17 and 18 are brought into abutment against the opposite ends of the elongated slot 14 in the moving link 13.

(c) As the end portion of the divided keyboard part 3 is further raised and rotated, the slide pin 19 provided on the bracket 12 of the cover plate 11 is slidingly moved in the elongated groove 16 of the divided keyboard part 3 away from the keyboard severed face while the moving link 13 is rotated clockwise as viewed in the drawings about the pin 17 until the divided keyboard part 3 assumes an attitude generally perpendicular to the bottom plane of the divided keyboard part 2.

(d) As the divided keyboard part 3 is rotated from its vertical position to be further opened apart from the divided keyboard part 2, the slide pin 19 provided on the bracket 12 of the cover plate 11 is moved along the elongated groove 16 further away from the keyboard severed face while the spacing between the pin 17 and the pin 18 is restrained by the elongated slot 14 in the moving link 13.

(e) When the divided keyboard part 3 is still further rotated and opened until the keyboard face thereof is flush with that of the divided keyboard part 2, the slide pin 19 provided on the bracket 12 of the cover plate 11 is further moved along the elongated groove 16 to the end of the groove opposite from the keyboard severed face. In this state, the pins 17 and 18 are positioned at the opposite ends of the elongated slot 14 in the moving link 13 while the end face of the joint flange 132 of the cover plate 11 comes into abutment with the cut face of the cutout 131 to prevent any further rotation of the divided keyboard part 3 in a clockwise direction as viewed in the drawings. In other words, the divided keyboard parts 2 and 3 are held in place with their keytops 4 positioned in the same plane.

Another example of the hinge mechanism will be described below.

FIG. 8 illustrates the various stated of this form of hinge mechanism changing from the folded state to the usable state as well as the construction of the hinge mechanism. In FIG. 8 again, the cover plate 11, bracket 12, slide pin 19, moving link 23, and coupling pins 27, 30 are shown in solid lines for the benefit of understanding the relationship therebetween. Actually, as in the previous embodiment, the coupling pins 27, 30 and the moving link 23 are provided in the side panel of the keyboard. FIG. 9(a) illustrates the moving link used in the hinge mechanism of this embodiment and the coupling pin 27 having a D-shaped cross-section.

The hinge mechanism of this embodiment is different from that described with reference to FIG. 5 with respect to the shape of the elongated slot (cutout portion) in the moving link and the cross-sectional shape of the coupling pin 27 and in that the coupling pin 30 is rotatably inserted in a pin receiving hole in the moving link.

As shown in FIG. 9(a) the coupling pin 27 has a D-shape in cross-section and the elongated slot 24 in the moving link 23 comprises a narrow section 25 constituting a substantial part of the slot and a circular section 26 formed in the moving link 23 adjacent one end thereof. The width of the narrow section 25 is slightly greater than the minor diameter d1 of the D-shaped cross-section of the coupling pin 27 while the diameter of the circular section 26 is slightly greater than the major diameter d2 of the D-shaped cross-section. The coupling pin 30 provided on the divided keyboard part 3 is inserted in a pin receiving hole 28 formed in the moving link 23 adjacent the other end thereof so that the moving link 23 is pivotally supported on the pin 30.

(a) In the horizontally disposed folded state, the divided keyboard parts 2 and 3 are folded one on the other with the sides of their keytops 4 facing each other. The cover plate 11 covers the severed faces of the divided keyboard parts while it is oriented generally vertically and the pin 19 planted in the bracket 12 is at a position closer to the severed faces of the keyboard in the elongated groove 16 of the divided keyboard part 3. The moving link 23 is oriented vertically as it is guided by the pin 27 of D-shape in cross-section. At this time, the pin 27 of D-shape in cross-section is positioned in the narrow section 25 of the slot in the moving link 23 at the end toward the pin receiving hole 28.

(b) As the end portion of the divided keyboard part 3 opposite from the severed face is raised from the stowed state, the divided keyboard part 3 is pivoted about the slide pin 19 and the D-shaped pin 27 is brought into abutment with the circular section 26 of the elongated slot in the moving link.

(c) As the end portion of the divided keyboard part 3 is further raised and rotated, the slide pin 19 provided on the bracket 12 of the cover plate 11 is slidingly moved in the elongated groove 16 of the divided keyboard part 3 while the moving link 23 is rotated about the D-shaped pin 27 until the divided keyboard part 3 assumes a generally vertical attitude.

(d) As the divided keyboard part 3 is rotated from its vertical position to be further opened apart from the divided keyboard part 2, the slide pin 19 provided on the bracket 12 of the cover plate 11 is moved along the elongated groove 16 further away from the keyboard severed face while the spacing between the coupling pin 27 and the pin 30 is restrained by the pin receiving hole 28 and the elongated slot 24 in the moving link 23.

(e) When the divided keyboard part 3 is rotated to be still further opened apart from the divided keyboard part 2 until the top surfaces of the keytops of the two divided keyboard parts 2 and 3 are placed in the same plane, the slide pin 19 provided on the bracket 12 of the cover plate 11 is further moved along the elongated groove 16 to the end of the groove opposite from the keyboard severed face. In this state, as in the previous embodiment, the end face of the joint flange 132 of the cover plate 11 comes into abutment with the cut face of the cutout 131, which serves, in coordination with the restraint by the moving link 23 and the pins 27, 30, to prevent any further rotation of the divided keyboard part 3 in a clockwise direction as viewed in the drawings, so that the divided keyboard parts 2 and 3 are held in the same plane.

Figure 8A:
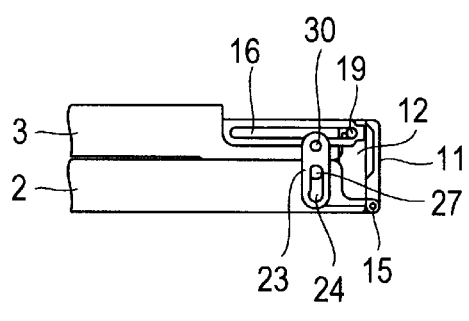
FIG. 8(a) is a side view illustrating the folding keyboard according to another embodiment of the present invention being in its folded state.
Figure 8B:
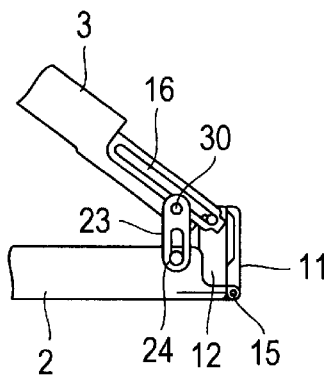
FIGS. 8(b), 8(c) and 8(d) are sequential side views illustrating the intermediate states of the keyboard from the folded state of FIG. 8(a) to the usable state.
Figure 8C:
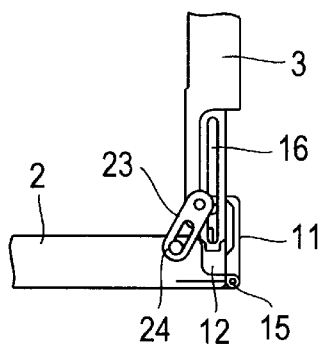
Figure 8D:
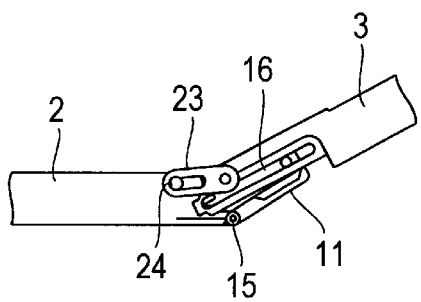
Figure 9A:
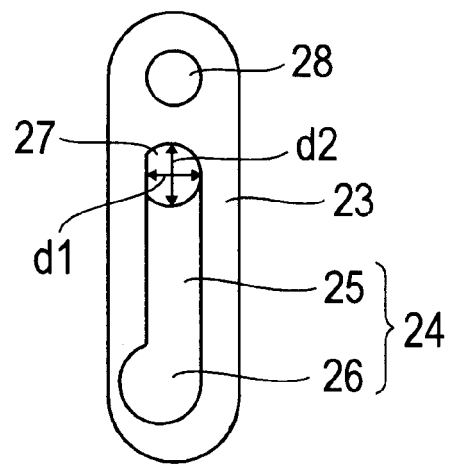
FIG. 9(a) is a front view illustrating another form of the moving link for use with the folding keyboard of the present invention and FIG. 9(b) is a front view illustrating yet another form of the moving link.

With the hinge mechanism described just above utilizing the pin 27 of D-shape in cross-section and the elongated slot including the circular section 26, when the divided keyboard part 3 is moved to its generally vertical position (FIG. 8(c)) halfway during the opening and closing operation, the circular section 26 is fitted over the D-shaped pin 27, and then the opening and closing operation is carried out along a constant locus about the D-shaped pin 27, thereby allowing for the smooth opening and closing of the keyboard.

Figure 9B:
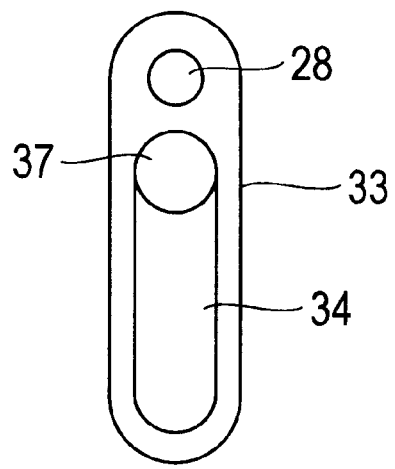

FIG. 9(b) illustrates a further alternate form of the moving link. This moving link 33 is characterized by providing a pin receiving hole 28 in addition to an elongated slot 34 having a constant width. It will readily be appreciated that the use of this moving link 33 will provide the opening and closing action similar to that achieved by the moving links 13 and 23.

As discussed above, the present invention greatly facilitates the opening and closing operation of the folding keyboard by providing for opening the keyboard from its folded state to the usable state in a single step of raising and rotating the end of one of the divided keyboard parts. In addition, it is also to be appreciated that the mechanism requiring only one operation for opening and closing the keyboard is mechanically more sturdy than the mechanism requiring plural operations.

Moreover, in the folded state, the severed faces of the divided keyboard parts 2 and 3 are covered with the cover plate 11, whereby not only ingress of foreign matters such as dust, water drops and others can be prevented, but also the mechanical protection of the keyboard interior is provided as the parted portions are not bared.

Furthermore, the provision of the moving link and the coupling pins 17, 18 or 27, 28 facilitates the smooth opening and closing of the divided keyboard parts and yet eliminates the gap between the two divided keyboard parts in their usable position.

Next, the locking mechanism for the divided keyboard parts in their usable position will be described.

Figure 5E:
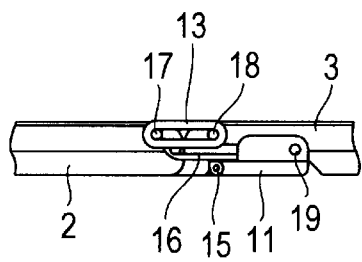
FIG. 5(e) is a side view illustrating the folding keyboard of the embodiment shown in FIG. 4(a) being in its usable state.
Figure 8E:
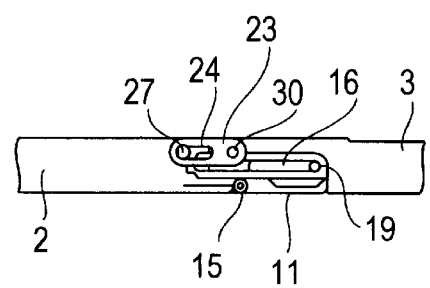
FIG. 8(e) is a side view illustrating the folding keyboard being in its usable state.

In the usable state (FIG. 5(e), FIG. 8(e)) of the folding keyboard as described above, there is possibility that an inadvertent force exerted on the divided keyboard parts 2 and 3 may fold them back.

FIG. 10 illustrates the locking mechanism in the usable state (open state) of the folding keyboard. The locking mechanism 40 is provided in each of the front side panel and the rear side panel of the keyboard 1 toward the respective severed faces of the keyboard. The side panel of the divided keyboard part 3 is formed in its outside surface with an oblong window 42 through which an operating lug 41 protrudes out.

The operating lug 41 is secured to an operating plate 43 which is in turn accommodated for longitudinal (left-to-right) sliding movement in a guide channel 45 formed in each of the front and rear side panels. The divided keyboard part 2 is formed in its severed face with an engagement aperture 44 which is adapted to receive the operating plate 43 as it is retractably advanced in sliding motion by moving the operating lug 41 toward the divided keyboard part 2.

Figure 10A:
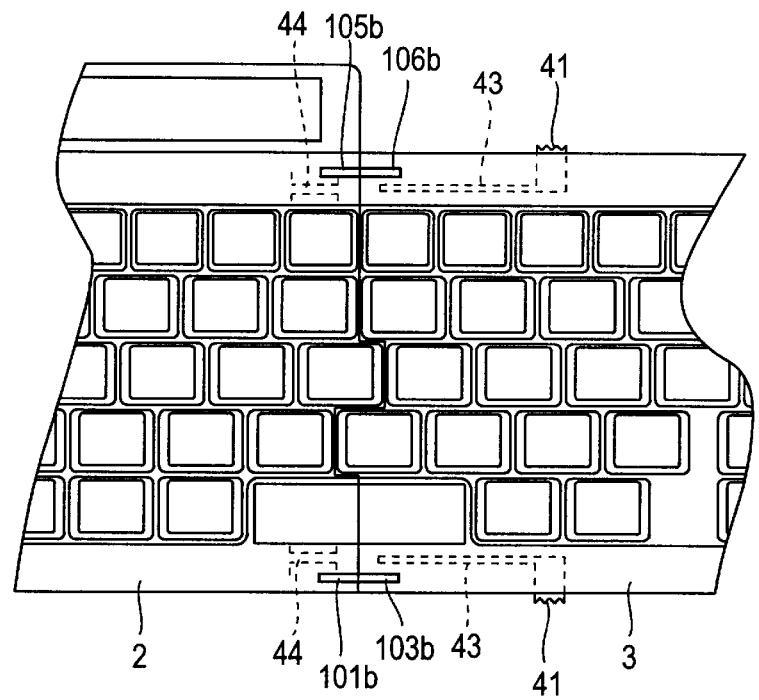
FIG. 10(a) is a plan view illustrating the locking mechanism in the folding keyboard of the present invention.
Figure 10B:
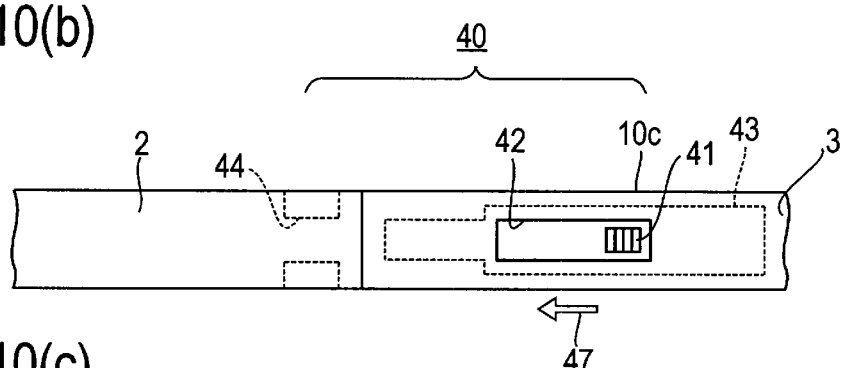
FIG. 10(b) is a front view illustrating the locking mechanism in its unlocked position.
Figure 10C:
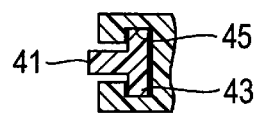
FIG. 10(c) is a sectional view taken on the line 10c in FIG. 10(b)
Figure 10D:
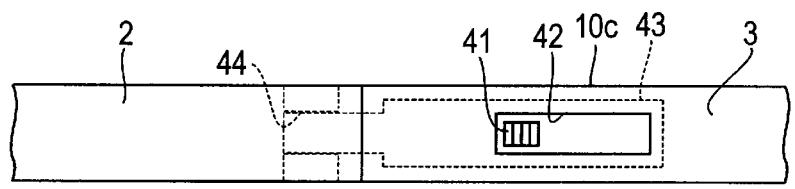
FIG. 10(d) is a front view illustrating the locking mechanism in its locked position.
Figure 11A:
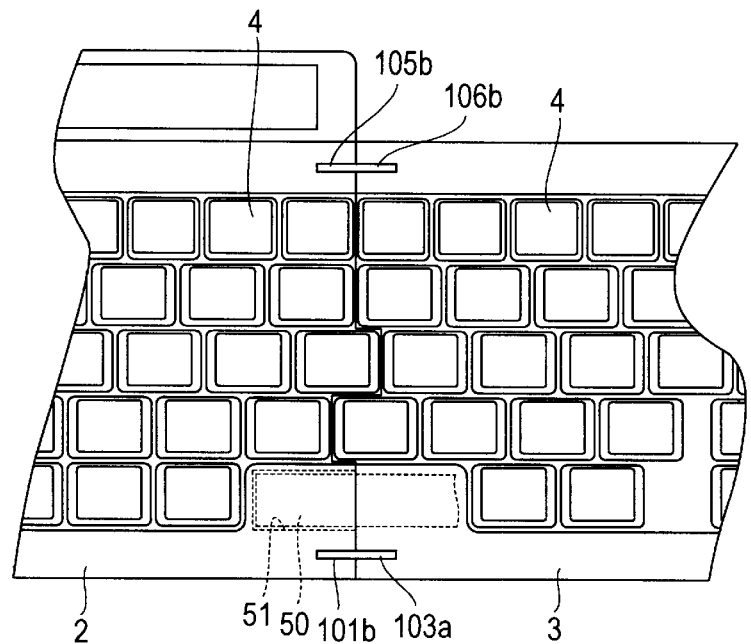
FIG. 11(a) is a plan view illustrating the arrangement for electrical connection between the divided keyboard parts of the present invention.
Figure 11B:
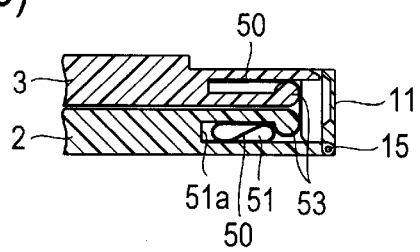
FIG. 11(b) is a cross-sectional side view illustrating the electrical connection between the divided keyboard parts in their folded position.
Figure 11C:
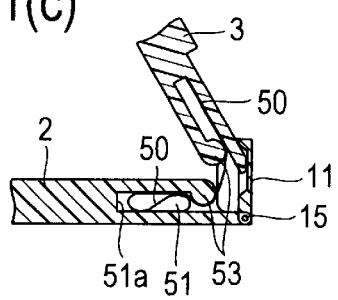
FIGS. 11(c) and 11(d) and 11(e) are sequential cross-sectional side views illustrating the intermediate states of the electrical connection changing from the folded state to the usable state.
Figure 11D:
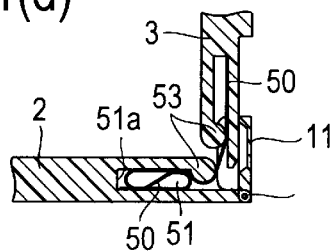
Figure 11E:
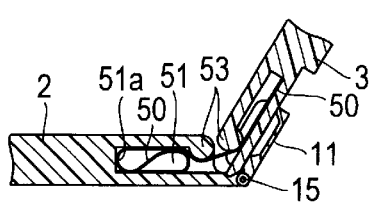
Figure 11F:
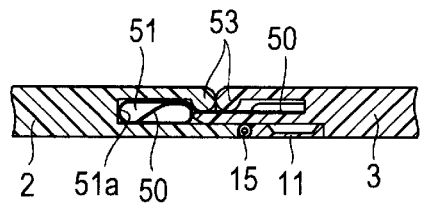
FIG. 11(f) is a cross-sectional side view illustrating the electrical connection in the usable state of the keyboard.

As the operating lug 41 is slidingly moved along the window 42 in the direction (right) indicated by the arrow 47 from the unlocked position shown in FIG. 10(b), that is, toward the divided keyboard part 2, the operating plate 43 is moved in unison in the direction indicated by the arrow 47 to be inserted and engaged in the engagement aperture 44 to thereby be brought into the position shown in FIG. 10(*d*), that is, the locked state. In this state, even if an external force should be exerted between the divided keyboard parts 2 and 3, the keyboard parts would be held in the same plane by cooperation of the operating plate 43 and the engagement aperture 44.

Figure 1A:
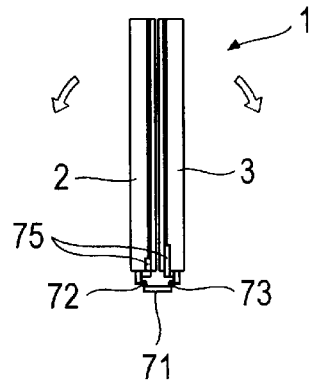
FIG. 1(a) is a side view illustrating the prior art folding keyboard of FIG. 1 being in its folded state.
Figure 1B:
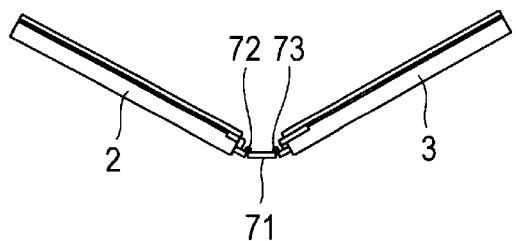
FIGS. 1(b) and 1(c) are sequential side views illustrating the intermediate states of the keyboard from the folded state to the usable state.
Figure 1C:
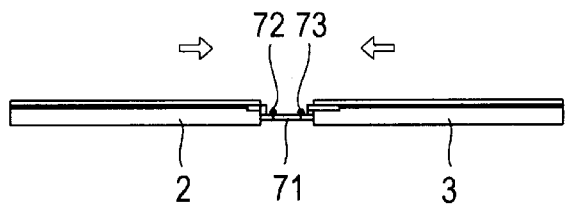
Figure 1D:
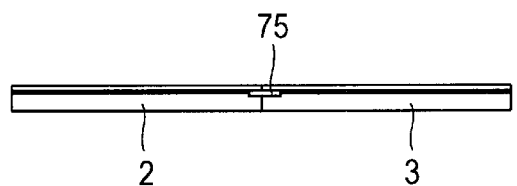
FIG. 1(d) is a side view illustrating the folding keyboard being in its usable state.
Figure 2:
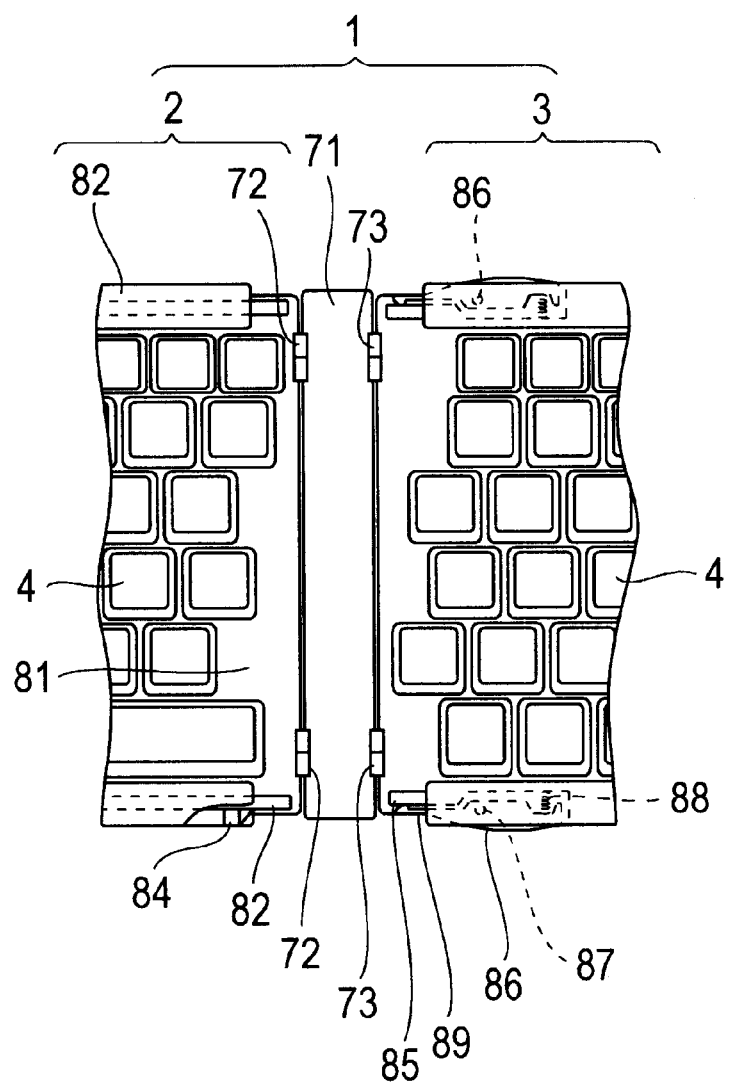
FIG. 2 is a plan view illustrating the construction of the parting portion of the prior art folding keyboard.
Figure 3:
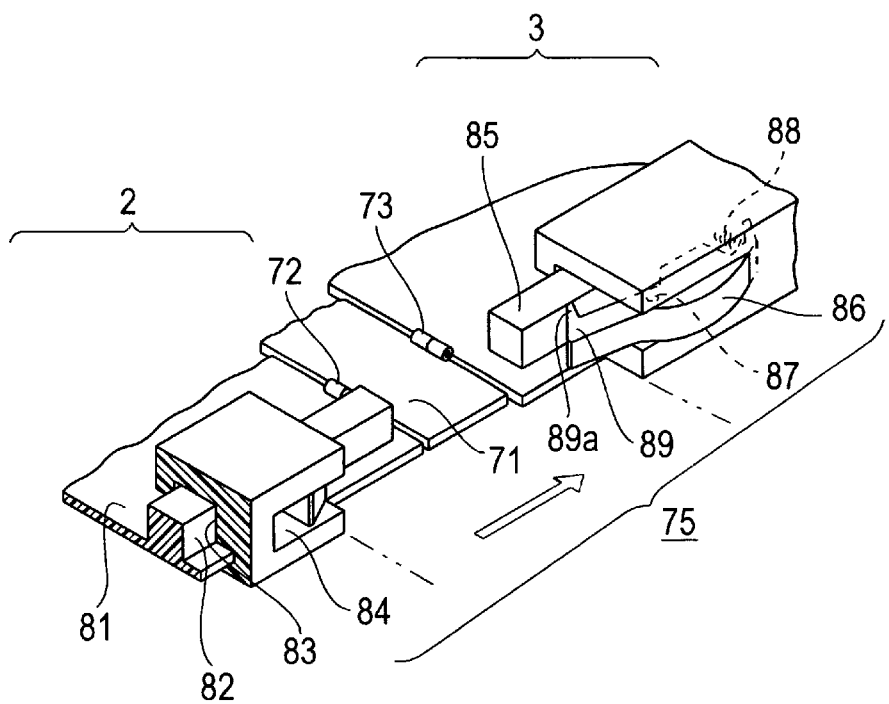
FIG. 3 is a perspective view illustrating the latching mechanism used in the prior art keyboard shown in FIG. 2.

It is to be understood that the latch mechanism 75 shown in FIGS. 2 and 3 may be used as the locking mechanism.

As is appreciated from the foregoing description, the provision of the locking mechanism may prevent the folding keyboard from being folded back in its usable state.

Finally, the arrangement for electrical connection between the divided keyboard parts will be described.

FIG. 11(*a*) shows a fraction of the keyboard in a plan view, and FIGS. 11(*b*)-11(*f*) sequentially illustrate the arrangement for electrical connection between the divided keyboard parts changing from the folded position in FIG. 11(*b*) to the usable state in FIG. 11(*f*). The flexible wiring board (FPCB) for the keyswitches of one of the divided keyboard parts 2 and 3, the divided keyboard part 3 in this example, is bundled and connected via a connecting flexible wiring board (FPCB) 50 to the flexible wiring board for the other divided keyboard part 2.

More specifically, one of the divided keyboard parts 2 and 3, the keyboard part 2 in this example, is provided adjacent its severed face with a storage compartment 51 in which a connecting flexible wiring board (FPCB) 50 is stowed in a folded form. An extension of the folded connecting FPCB 50 is guided along arcuate sections 53 formed on U-shaped top portions of the severed faces of the divided keyboard parts 2 and 3 to be connected to the flexible wiring board for the other divided keyboard part 3.

As the end portion of the divided keyboard part 3 is raised and rotated, the fraction of the connecting FPCB 50 corresponding to the portion spanning the two arcuate sections 53 is gradually accommodated in the storage compartment 51, that is, the longitudinal length of the folded portion in the storage compartment 51 is increased while the far end of the folded length is moving closer to the rear wall 51*a* of the storage compartment 51. In the usable state shown in FIG. 11(*f*), the fraction of the connecting FPCB 50 corresponding to the portion spanning the two arcuate sections 53 is fully accommodated in the storage compartment 51 whereupon the entire connecting FPCB 50 lies generally in the same plane between the divided keyboard parts 2 and 3.

In this manner, it will be appreciated that any trouble due to sag of the connecting FPCB 50 which may occur during the opening and closing operation of the folding keyboard as well as occurrence of any tension in the connecting FPCB 50 can be prevented.

Further, it is to be understood that while the above description is made in connection with the operation from the folded state to the usable state, the operation from the usable state to the usable state may similarly take place in the reverse order.

It should be appreciated that storage compartments 51 may be provided in both of the divided keyboard parts 2 and 3 so that the connecting FPCB 50 may be accommodated dividedly between the divided keyboard parts 2 and 3.

In addition, in the construction as described above, the divided keyboard parts 2 and 3 may be changed with each other so that the cover plate 11 is pivotally connected to the divided keyboard part 3 by pivot pins 15. Further, while in the foregoing description the elongated groove 16 is described as being formed in the outside surface of the side panel, it may be formed in the inside surface. In that case, the slide pin 19 would be disposed on the outside face of the bracket 12.

Owing to the construction as described hereinabove, the present invention provides the following advantages:

(1) It allows for effecting the operation of the folding keyboard from its folded state to its usable state and vice versa in a single step, and yet covering the severed faces of the divided keyboard parts in their folded state.

(2) The provision of the moving link facilitates smooth operation of the divided keyboard parts between the folded state and the usable state.

What is claimed is:

1. A folding keyboard comprising;

first and second divided keyboard parts divided along a boundary line between adjacent keytops located generally in a center of the keyboard, wherein each divided keyboard part has a severed face;

an elongated cover plate pivotally attached on one side edge thereof to a lower portion of the severed face of said first divided keyboard part, said cover plate having opposed brackets upstanding generally vertically from opposite ends thereof and two opposed slide pins provided one on each of said brackets toward another side edge of said cover plate, said slide pins being slidably received in corresponding elongated grooves formed in opposite side surfaces of said second divided keyboard part toward the severed face thereof;

a pair of coupling pins provided on opposite side panels of each of said divided keyboard parts; and moving links each having a longitudinally elongated slot in which one pair of said coupling pins are slidably and loosely fitted.

2. The folding keyboard set forth in claim 1, further comprising locking means for holding said divided keyboard parts in locked position with the severed faces in abutment with each other, said locking means being shiftable between the locked position and unlocked position.

3. The folding keyboard set forth in claim 1, wherein at least one of said divided keyboard parts is provided adjacent the severed face thereof with a storage compartment in which a connecting flexible wiring board in a folded form for interconnecting flexible wiring boards for said two divided keyboard parts is accommodated.

4. The folding keyboard set forth in claim 1, wherein said opposite side panels of a respective divided keyboard part have link receiving grooves out thereinto from the severed face of said respective divided keyboard part, said moving links being rotatably received in the link receiving grooves.

5. The folding keyboard set forth in claim 1, wherein locations of said coupling pins and length of said elongated slot in each of the moving links are chosen such that as said divided keyboard parts are opened from a folded state, the divided keyboard parts are rotated about said slide pins with each pair of said coupling pins positioned in a respective elongated slot at opposite ends thereof, and said cover plate and said moving links are rotated while said slide pins are slidingly moved.

6. A folding keyboard comprising:

first and second divided keyboard parts divided along a boundary line between adjacent keytops located generally in a center of the keyboard, wherein each divided keyboard part has a severed face;

an elongated cover plate pivotally attached on one side edge thereof to a lower portion of the severed face of said first divided keyboard part, said cover plate having opposed brackets upstanding generally vertically from opposite ends thereof and two opposed slide pins provided one on each of said brackets toward another side edge of said cover plate, said slide pins being slidably received in corresponding elongated grooves formed in opposite side surfaces of said second divided keyboard part toward the severed face thereof;

a pair of coupling pins provided on opposite side panels of each of said divided keyboard parts; and moving links each having an elongated slot in which one of the pair of coupling pins is slidably and loosely fitted, each of said moving links further having a pin receiving hole adjacent one end thereof in which the other pair of coupling pins is inserted and journalled.

7. The folding keyboard set forth in claim 6, wherein said elongated slot in a respective moving link includes a narrow section with a width and a circular section with a diameter, wherein the circular section is positioned oppositely from said pin receiving hole of said respective moving link, said coupling pin slidably and loosely fitted in said elongated slot having a D-shape in cross-section, a minor diameter of the D-shape cross-section of the coupling pin being approximately equal to the width of the narrower section while a major diameter of the D-shape is approximately equal to the diameter of the circular section, and a flat surface of the D-shape being generally parallel to a direction of thickness of the keyboard.

8. The folding keyboard set forth in claim 6, further comprising locking means for holding said divided keyboard parts in locked position with the severed faces in abutment with each other, said locking means being shiftable between the locked position and unlocked position.

9. The folding keyboard set forth in claim 6, wherein at least one of said divided keyboard parts is provided adjacent the severed face thereof with a storage compartment in which a connecting flexible wiring board in a folded form for interconnecting flexible wiring boards for said two divided keyboard parts is accommodated.

10. The folding keyboard set forth in claim 6, wherein said opposite side panels of a respective divided keyboard part are formed adjacent the severed face of the respective divided keyboard part with link receiving grooves in which said moving links are rotatably received.

11. The folding keyboard set forth in claim 6, wherein locations of said coupling pins and length of said elongated slot in each of the moving links are chosen such that as said divided keyboard parts are opened from a folded state, the divided keyboard parts are rotated about said slide pins with one of each pair of said coupling pins positioned in a respective elongated slot at an end thereof opposite from a respective pin receiving hole, and said cover plate and said moving links are rotated while said slide pins are slidingly moved.

* * * * *